US00RE34474E

United States Patent [19]

Lutz

[11] E Patent Number: Re. 34,474

[45] Reissued Date of Patent: Dec. 14, 1993

[54] BICYCLISTS HAND-PORTABLE RACK-MOUNTING GARMENT-PACK W/PANNIERS

[76] Inventor: Raymond C. Lutz, 1010 Old Chase Ave., El Cajon, Calif. 92020-7739

[21] Appl. No.: 765,221

[22] Filed: Sep. 23, 1991

Related U.S. Patent Documents

Reissue of:

[64] Patent No.: 4,869,408
Issued: Sep. 26, 1989
Appl. No.: 268,082
Filed: Nov. 7, 1988

[51] Int. Cl.[5] ..... B62J 9/00; A47G 25/42; B65D 85/18

[52] U.S. Cl. ..... 224/32 A; 224/42.01; 224/151; 206/287.1; 223/89

[58] Field of Search ..... 224/30 R, 31, 32 A, 224/32 R, 33 R, 34, 42.01, 151; 206/284–291; 190/1, 13 R, 15.1; 223/89, 94; 493/935; 280/202; 294/141, 142, 149, 151

[56] References Cited

U.S. PATENT DOCUMENTS

| | | | |
|---|---|---|---|
| 567,159 | 9/1896 | Peirce | 224/33 R |
| 1,323,130 | 11/1919 | Walker | 223/94 |
| 2,341,104 | 2/1944 | Kleber | 206/284 |
| 2,808,187 | 10/1957 | Bailey | 223/89 |
| 3,703,978 | 11/1972 | Sammartino | 223/89 |
| 3,786,972 | 1/1974 | Alley | 224/31 |
| 3,874,574 | 4/1975 | Heise | 224/31 |
| 3,881,579 | 5/1975 | Keerdoja | 206/287 |
| 3,937,374 | 2/1976 | Hine, Jr. | 224/32 A |
| 4,271,996 | 6/1981 | Montgomery | 224/31 |
| 4,295,586 | 10/1981 | Shockley | 224/32 R |
| 4,301,952 | 11/1981 | McNeill | 224/32 A |
| 4,345,703 | 4/1982 | Allen | 224/32 A |
| 4,387,835 | 6/1983 | Gölzer | 224/32 A |
| 4,418,850 | 12/1983 | Jackson et al. | 224/32 A |
| 4,433,802 | 2/1984 | Woolf | 224/32 A |
| 4,450,988 | 5/1984 | Meisel | 224/32 A |
| 4,460,115 | 7/1984 | Jackson | 224/32 R |
| 4,491,258 | 1/1985 | Jones | 224/153 |
| 4,580,706 | 4/1986 | Jackson et al. | 224/32 A |
| 4,609,084 | 9/1986 | Thomas | 190/110 |
| 4,655,343 | 4/1987 | Lane et al. | 206/287.1 |
| 4,662,548 | 5/1987 | Jackson et al. | 224/32 A |
| 4,693,368 | 9/1987 | King et al. | 206/287.1 |
| 4,720,027 | 1/1988 | Board | 224/35 |
| 4,901,897 | 2/1990 | Briggs et al. | 224/151 X |

FOREIGN PATENT DOCUMENTS

| | | | |
|---|---|---|---|
| 0183595 | 7/1922 | United Kingdom | 224/32 A |
| 2180737 | 4/1987 | United Kingdom | 224/32 A |

*Primary Examiner*—Henry J. Recla
*Assistant Examiner*—J. Casimer Jacyna

[57] ABSTRACT

A specialized garment-bag particularly useful for commuting bicyclist's, wherein is provided a flexible canvas like envelope compartment suitably formed as to receive a suit-jacket folded spinewardly therein, and the slacks folded in half therewith, an edge-zipper closing the envelope-halves so as to enable the thus sealed compartment to be centrally draped laterally down upon a conventional bike carrier-rack fixture; preferably including an integral external convenience-compartment with zippered closure extending longitudinally above the said draped envelope portion; and, a pair of laterally disposed pannier compartments also made integrally with the outer envelope surfaces, each having a horizontal zipper closure set near the top of their confines so that the sides of the said convenience-compartment also forms the upper regions of the side panniers; plus, special dowel like longerons allow a substantial aftward extension of the pack assembly beyond a normal bike carrier-rack's support, and a special folding coat-hanger is provided which readily facilitates both the folded mode of usage as well as opening out as a normal closet-hanger; while an alternate hand-portable modality is also set forth, whereby dual opposed hand-grips may be readily deployed from the extreme ends of the pack assembly once the pack is detached via two lateral strap hold-downs whereupon the pack-assembly remains in the folded condition while simply inverted for instant satchel like carrying ease.

10 Claims, 2 Drawing Sheets

PA
FA

BICYCLISTS HAND-PORTABLE RACK-MOUNTING GARMENT-PACK W/PANNIERS

Matter enclosed in heavy brackets [ ] appears in the original patent but forms no part of this reissue specification; matter printed in italics indicates the additions made by reissue.

BACKGROUND OF THE INVENTION

This invention relates to personal hand-carried utility-bag apparatus, and more specifically to such apparatus adapted to bicycle use, to include dual laterally disposed pannier compartments.

While there have been various bicycle type convenience-carrier apparatus produced, this invention has found them to be lacking in certain important convenience features which are of value in making cycling for the daily commuter or distance traveler more practical, abet more enjoyable. For example, U.S. Pat. No. 4,345,707 (August 1982) set forth a so called 'pannier' (originally bread-basket) type carrier having a large internal compartment which wraps over a special mounting-frame support made to be attached presumably to an existing carrier-rack, while thus extending well down at both lateral sides of the bike's rear-wheel; the affair being entirely detachable as an assembly via a rigid carrying-handle. However, this inventor intends to show there is actually no need for a rigid folding sub-frame, yet there is need for an improved compartmentalized arrangement for one's apparel. Another example of prior-art is demonstrated in U.S. Pat. No. 4,387,835 (June 1983), wherein is set forth an arrangement of dual independent laterally disposed carrier pannier compartments which hang from an existing carrier-rack, and including means by which a locking-cable may be strung through the separate integral-handle portions thereto, while enabling the individual panniers to be detached and intimately mated side-to-side so as to merge the two handle portions as one handle when carried on foot. Again, while clever in execution, the arrangement does not include suitable provisions for one's wearing apparel. Yet another example of prior-art is set forth in U.S. Pat. No. 4,450,988 (May 1984), wherein is provided a bifurcated pannier arrangement suitable for front or rear mounting, employing a rigid frame structure of inverted-V shape, to which a pair of rigid pannier compartments are hingedly joined at their apex, and which may be demounted intact and pivoted together at their bottom bifurcations. But here again, revealing no forethought to proper carrying of one's wearing apparel, such as a suit/jacket & pants. Likewise, U.S. Pat. No. 4,609,084 (September 1986) which demonstrates a back-pack readily adaptable to bicycle mounting as panniers upon a conventional carrier-rack. However again, no particular attention is given to the problem of providing suitable carrying means for one's more formal clothing attire, which would look terribly rumpled and wrinkled if unfolded from any one of the afore exemplified, if presently best available art.

Furthermore, although none of the preceding examples even gave mention as to need for a convenient coathanger, this inventor has searched to no avail in finding a coathanger particularly adapted to offering a spineward folding arrangement which could support the coat-jacket equally as well while folded or unfolded. It seems that all traveler type coat-hangers merely collapse, particularly downwardly at the shoulder, for purposes of compact stow only, not to facilitate more compact hanging of the jacket while traveling.

Therefore, for the above exemplified reasons, this inventor has developed a new type of pannier configuration in which one may conveniently lay in their more formal non-cycling clothing without having to carry a steam-iron along to eliminate carrier-pack induced wrinkles. Presently this development is the subject of mfg. & mkt. preparation under the proprietary trade name of "CommuterPak" in El Cajon, Calif.

SUMMARY OF THE PREFERRED EMBODIMENTS

Today, America is coming of age with regard to interest in aerobic conditioning fitness, and many communities planning to provide safe commuting bike-ways so that one may enjoy the freedom of cycling to work in reasonable safety from automotive traffic. However, the notion of such daily cycling also poses new problems, not the least of which is "how do I carry my business garments without appearing soiled and wrinkled in the process?". Indeed, my new bicycle garment carrying commuter-pack is made of soft non-rigid construction, that serves to solve the quandary in an efficient, inexpensive, functional, and personally convenient manner, without sacrifice of the other utility carrying capability offered by other bike-panniers.

A. Accordingly, it is an object of this invention to set forth a special pannier/garment-bag article in which a suit-jacket or sport-jacket coat may be uniquely laid into a full-length compartment, the jacket being first folded spinewardly in back-to-back fashion so that the arms also lay naturally unfolded the vertical length of the jacket. The compartment thus being closed via a perimeter zipper, as a flat planar envelope as a first compartment, which is then merely draped transversely over any existing bicycle carrier-rack of conventional front or rear type.

B. Another object of this invention is to set forth a special pannier equipped commuter-pack article according to the above configuration wherein the once draped envelope portion reveals two laterally disposed pannier third and forth compartments extending up to nearly the top of the mounted pack and serving general utility carrying convenience, while being preferably closed via discrete zipper closures arranged horizontally near the top region of their respective side portions, the zippers extending longitudinally from front to rear while preferably covered by a full length weather-flap of conventional sewn construction; the panniers being capable of carrying one's newspaper/magazine, attache-case, notebook, bathing-towel (for showering at work), groceries for example.

C. Another object of this invention is to set forth a special pannier equipped commuter-pack article according to the above configuration wherein a second compartment for items of convenience is situated atop the draped envelope first compartment, the topmost second compartment being rectangular in longitudinal orientation whereby four vertical walls are formed upward from the first envelope outer wall about four-inches, and a top flap like wall is included as covering thereto along with an upper perimeter zipper is included at three upper-edges of the second compartment; this compartment thus being capable of carrying one's work-shoes, camera, shaving-kit, plus a hiddenpocket is included thereto within which to stow one's wallet and keys.

D. Another object of this invention is to set forth a special pannier equipped garment-bag according to the above described embodiments, wherein is included a simple light-weight anti-tangle device comprised of a pair of built-in rigid rod like members, each installed under a webbing like covering which extends from the upper frontal underside of the drape mounted envelope compartment and diagonally down toward the aftward lower trailing edge of the envelope wall, so as to thereby enable the envelope wall to impinge upon the substantially vertical carrier-rack supports which attach near the wheel-axis; thereby obviating hazardous entanglement into the wheel-spokes moving by; the whole hanging envelope/rod aggregation being completely stabilized at each respective lateral side by means of a tie-strap device which wraps securely around a portion of the bike-frame such as the rear seat-stay downtubes, the tie-straps thus being a vital combination by which to negate flapping of the laterally trailing rods, and the ties are thus preferably an extension of the upper webbing but preferably of hook and loop type fabric fastener such as Velcro®, although certainly other types of known strap fastening means may be employed if desired.

E. Another object of this invention is to set forth a special pannier equipped garment-pack according to the above described embodiments, wherein is included a pair of separate longitudinally oriented rod like rack extension support members, which are built-in to the underside of the drape mounted envelope compartment beneath a webbing like covering sewn to the envelope wall, so as to facilitate a desired aftward extension of the envelope like first compartment which is otherwise subject to sagging downward beyond the support of the usually rather short carrier-rack; the rods being staged at the opposite transverse top or side edges of the carrier-rack, and also equipped with a pair of transversely oriented buckling straps which are sewn to the envelope under wall preferably to the rod-webbing for added reinforcement as they should be tightly secured around the underside of the carrier-rack while set well apart front to rear.

F. Another object of this invention is to set forth a special pannier equipped garment-pack according to the above described embodiments, wherein is included a special cut-away downward tapering pedal-relief configuration at each frontal edge of the envelope/pannier compartments, deemed necessary for adequate cyclicly-rotating passage of the cyclist's aft foot portion.

G. Another object of this invention is to set forth a second top most compartment as described above, wherein is included a large patch of 3M/Scotch-brand® type retro-reflective material sewn or bonded thereto, so as to make a large equilateral-triangle bike-safety symbol which would appear bright red at night for a rear mounted carrier-pack's aftward facing vertical-wall, and bright white at night for a front mounted carrier-pack's forward facing vertical-wall portion.

H. Another object of this invention is to set forth the preceding pannier equipped garment-pack configuration wherein is preferably included a special dual-action zipper arrangement for the first-compartment envelope, whereby the perimeter zipper is provided with two independently acting sliders having their closing mouths facing away from each other so that when each slider is moved fully away from the other the envelope compartment is fully closed; thereby allowing each slider to be thus slid only partially open (about 10–12 inches) sufficiently as to enable the user to reach in and withdraw a tuck-away satchel-like webbing-strap hand-grip from each end of the otherwise substantially closed compartment confines, thus the demounted pannier/-garment-pack or commuter-pack may be easily hand-portable when the assembly is inverted with the hand-grips brought together as a single hand-grip while also maintaining the inverted U-shaped pack in a very compact formation which still does not tend to crease or wrinkle the coat-jacket carried inside the first-compartment envelope since the bends imposed by the U-formation are relatively gentle in curvature.

I. Another object of this invention is to set forth the preceding pannier/garment-pack wherein is preferably included a special folding coat-hanger device, preferably formed from two-pieces of heat-treated (for rigidity) aluminum wire-rod of about ⅛-inch gauge, comprised of a right-half and a left-half portion of a familiar flat-triangular formation having both upper and lower support arms, and including wire-loop interlocking hinge-joints formed of the respective halfs so that the arms may be thus folded 180-degrees upon itself or opened out flat against the hinge-stops, whereupon a detention-paw extension of the lower left shoulder support is positively engaged over and against the lower right shoulder support rod portion for non-traveling use, yet the user may simply manually pull upon the jointed right and left lower support rods sufficiently in an axial direction (relative to the upper and lower hinge pivot-axis) as to cause a disengagement of the detention-paw which again allows the respective hanger halfs to be folded for travel without need of removal of the attendant coat-jacket since a special upwardly extending continuation of the upper-right shoulder support portion serves as a coat/collar-stay that includes a vertical downward extension having a final closed-loop which also serves as a convenient auxiliary lower hanger-loop entity to which a snag-hook or other coathanger may also be hung from below.

BRIEF DESCRIPTION OF THE DRAWINGS

The foregoing and still other objects of this invention will become more apparent, as well as various advantages and features of novelty residing in the present embodiments, from study of the following graphic displays of some preferred configurations wherein indicia of reference are shown to match related points in the text, as well as the annexed claims hereto; and accordingly a better understanding of the invention and the discovered uses is intended by reference to the drawings, which are considered as primarily exemplary and not restrictive in nature.

PREFERRED EMBODIMENT SPECIFICATIONS

Figures 1, 2, 3, 4:
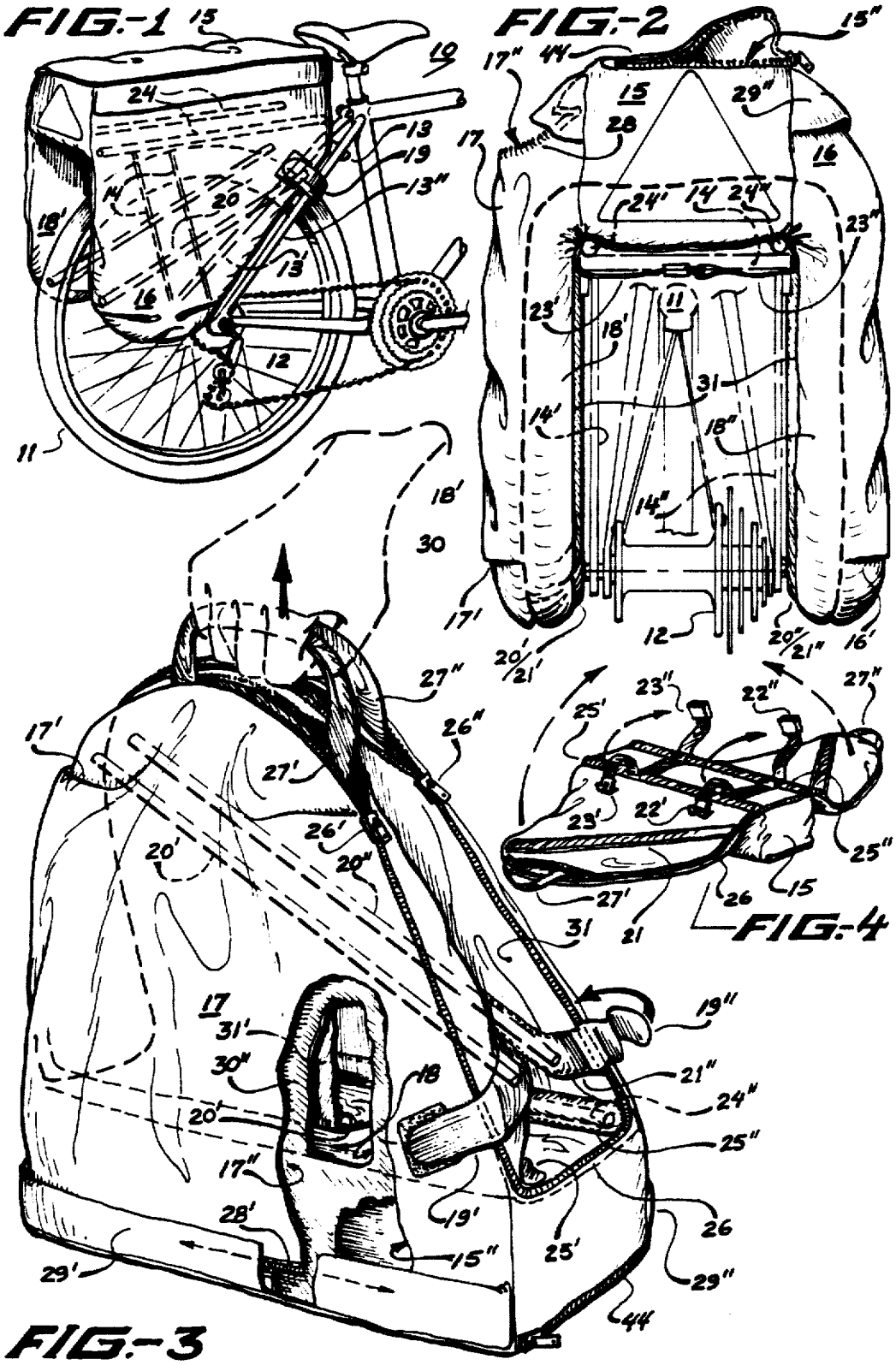
FIG. 1, is a ¾-rear/side-elevation pictorial view, showing how the invention is normally installed upon a conventional 10-speed/bicycle's rear/carrier-rack (actually concealed hereby the invention), while this same view also serves to essentially convey how the invention would be installed upon the front type carrier-racks as well (for all practical purposes), plus certain parts are shown here in phantom-outline for clarity.
FIG. 2, is a full rear/elevation-view of the invention as it would appear mounted upon a conventional carrier-rack which is shown in phantom-outline (dotted-line) as is the attendant rear-wheel, plus a phantom-outline also serves to indicate the relative separation of the four discrete compartmentalizations therein.
FIG. 3, is a ¾-pictorial view of the invention being held by hand in an alternate inverted modality, wherein certain parts are indicated in phantom-outline manner, while other parts are shown via deep cut-away method.
FIG. 4, is a similar view to preceding FIG. 3, although made smaller and with the opposite ends of the pack dropped down to reveal previously concealed parts, while the garment-envelope compartment remains substantially closed except for the ends.

Initial study of FIG. 1 serves to primarily orient the viewer as to the presently favored embodiment of the commuter-pack invention for bicycles, relative to a conventional 10-speed/bike 10 having standard rear-wheel 11 with chain-driven cluster/hub-assembly 12, while the bike-frame includes two familiar rearward trailing seat-stay tube members 13'/13" to which the conventional carrier-rack 14 (but concealed from view here) is bolted-up via tube-clamp 13, while the rack's two down-supports 16'/16" (normally hidden from sideward view so indicated via phantom-outline) also serve here as sway contact limits for impinging-rods 24'/24" built into the mounted pack.

Thus it is seen that the commuter-pack invention hereof is well adapted to the existing bicycle structure, while further examination in FIG. 2 reveals a first envelope compartment 18 draped over the carrier-rack 14, while a second convenience compartment section 15 is situated centrally above, and the right/left third and fourth pannier compartment relationships are also indicated at 16/17 respectively. Note also how the inverted-U formation of the underside envelope compartment 18 actually extends from one extreme lower side at 18' and over the rack 14 down to extreme lower alternate side 18" in one continuous portion while the transversely right and left pannier compartments 16/17 are separately formed contiguously thereto, as is the top compartment 15; thereby compartmentally united sections of a single assembly.

Viewing of FIG. 1 also showed how the rather streamlined appearing rearwardly slanted pannier/envelope forward portions are actually cut-away in a progressively increased downward taper formation at 16/18' so as to allow ample clearance for the rotary passage of the foot-petals, and the pannier/envelope members are held from flapping relative to the bicycle wheel by conveniently secured Velcro tm type strap-fasteners 19'/19" which simply wrap around the bike-frame members 13'/13" to mate upon the patches 19. These anti-flapping straps 19'/19" are preferably sewn as shown as upper extensions of the diagonally oriented dowel like stiffening-rods 20'/20" which are covered by webbing strips 21'/21" which impinge upon the nearly vertical carrier-rack supports 14'/14", the combination of the straps and rods at each respective side thus achieving the antiflapping improvement that negates any possibility of the aft envelope/panniers becoming entangled into the upward rotating wheel-spokes.

Although not visible in FIG. 1, the two identical laterally extending tie-down straps 22/23 of FIG. 4 are also shown positioned as part 23'/23" in FIG. 2 around under the existing carrier-rack 14. These straps include conventional male/female snap-on plastic-buckles 22'/23' which include provision for length adjustment to the girth of the different makes of carrier-racks on the market. Also note that there are two additional support-rods 24'/24" arranged longitudinally with the underside of the pack inside webbing like covering strips 25'/25", and actually serve to extend the effective length of the rack aftward via cantilevering several inches until about tangent with the trailing-edge of the wheel/tire 11, this increase in utility carrying space forming a very neat appearing aggregation well tailored to bicycle use.

Reference again to FIG. 3 shows how the commuter-pack may be readily detached from the rack 14 via uncoupled buckles 22'/23', whereupon it is instantly converted into a satchel like article by merely inverting the dual pannier sections 16/17 by a manual upending procedure, whereupon the special dual opposed slides 26'/26" of the perimeter zipper 26 are only partially slide open from each opposite end of the envelope compartment 18 so as to enable one to withdraw the satchel like tuck-away webbing hand-grips 27'/27" from their respective ends of the compartment as depicted.

Also included in FIG. 3 is a cut-away view of the inverted commuter-pack wherein is shown progressively from exterior to interior regions, the upturned weather-flap 29' normally concealing the left pannier zipper 28', the internal confines of the left pannier compartment 17", the internal confines of the center convenience compartment 15", the division wall 30" forming the inside partition between fourth compartment 17" and the second compartment 15" and first compartment 18 indicated by arrowing (since it actually wraps around to the other side which is a mirror image in construction). The envelope 18 also thus includes the internal facing 31' of the one-piece outer-wall 31 which extends from one end of the pack to the other. Notice also in FIG. 3 how the expansion-tuck 17' is shown spread out as it would be when the pannier compartment is well filled, and in FIG. 2 the center second-compartment zipper 44 is shown slid-open to show manner of access via reference arrow 15", as is likewise shown there with zipper 28' and the attendant reference arrow entering forth-compartment confines 17". It should be noted here also, that some users may prefer to leave the center compartment 15 upright as in FIG. 2, while folding the pannier compartments 16/17 upward as in FIG. 3, thereby resulting in a somewhat reduced height up to the handles 27'/27"; hence, making the pack somewhat easier to shove beneath a commuter-bus/seat (many community bus-services now having aft-outside bike-racks for longer cycling commutes).

Figures 5, 6, 7, 8:
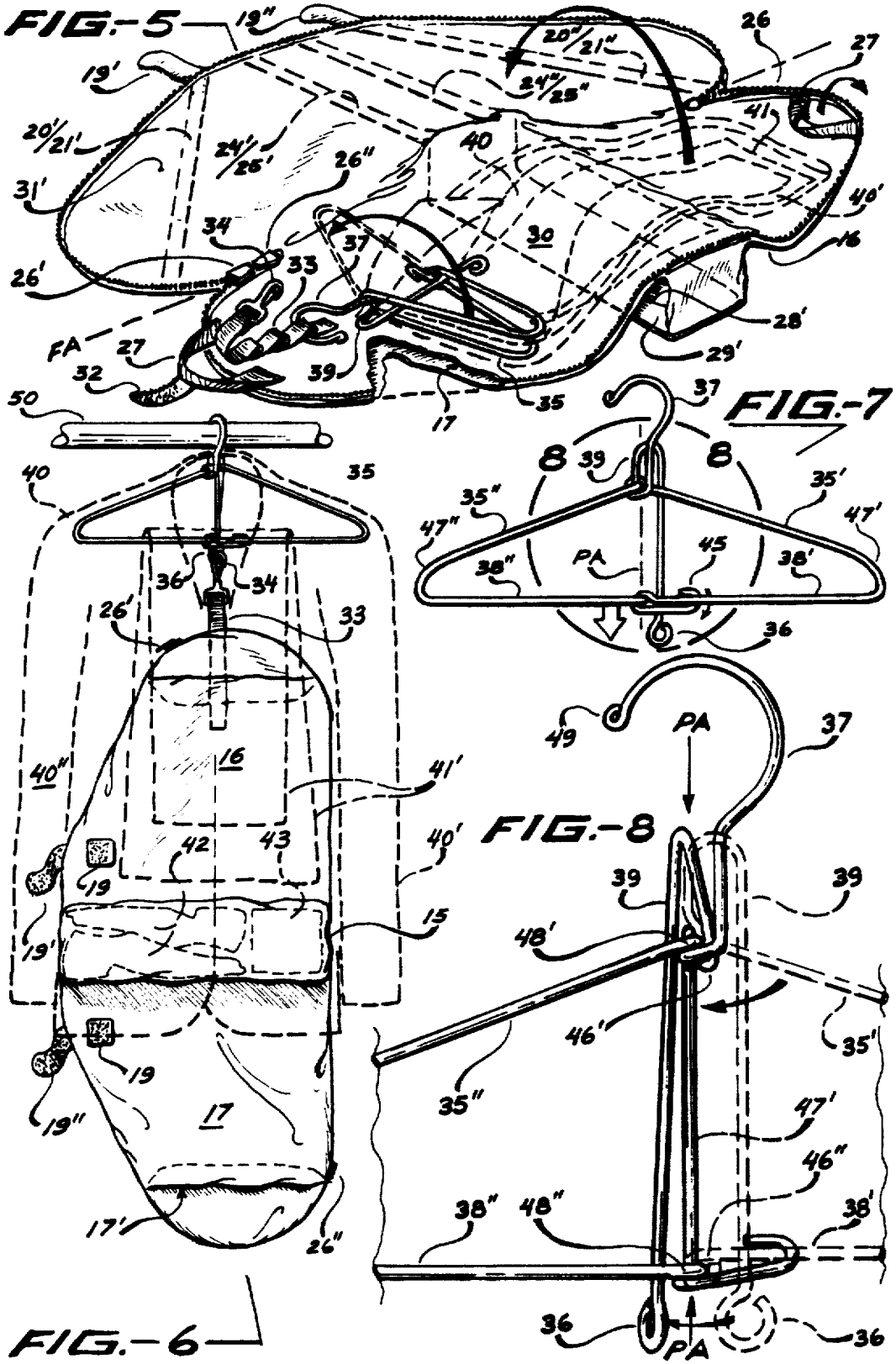
FIG. 5, is an enlarged oblique-view similar to that of FIG. 4, but wherein the garment-envelope has been fully opened, showing the relationship of the internal members including the optional folding coathanger relative to the accompanying coat jacket shown in phantom-outline for reference clarity.
FIG. 6, is an elevation-view showing the invention as it may be employed at the user's destination, wherein is included an exemplified phantom-outline reference to carried articles as well as the unfolded jacket now hanging vertically upon the special optional coat-hanger device seen in its opened modality.
FIG. 7, is an elevation-view of the special coathanger member as it appears in a fully opened condition of use.
FIG. 8, is an enlarged-view as is referenced in previous FIG. 7, showing how the device appears in 2-sequence half-folded condition, wherein the end portions of the support-arms are deleted for spatial consideration only.

Once the cyclist has reached the destination, the only need is to then undo the loop-tie strap 32 which is a Velcro ® type fabric-fastener band sewn to one of the hand-grips so as to conveniently hold the pack substantially as in FIG. 3, yet collapsing to condition of FIG. 4 when unfastened, and even better seen in FIG. 5 where the user has slid the slides 26'/26" both completely to either end of the zipper-track and then unfolded the envelope along reference only folding-axis indicated FA. The large arched reference-arrow demonstrates the 180-degree envelope opening procedure, revealing the internal members which includes a special multiple-loop hanger 33 formed of webbing material which is gathered and sewn in several places and also includes a final loop-end having a standard snag-hook thereto which may be employed as is indicated in FIG. 6. Also shown in FIG. 5 is the backside stitching of the four stiffening dowels at points 20'/21' & 20"/21" representing the hidden anti-flapping members, and points 24'/25' & 24"/25" representing the hidden anti-saging members, all of which are sewn to the outside of panel 31. Opposite panel 30 is shown with an exemplified coat-jacket 40 and slacks 41 indicated via phantom-outlines in their normal respective folded positions, relative to the special folding coat-hanger support-arms 35 and 38. The view of FIG. 6 suggests a closet clothes-hanger pole 50 to which the special folding/coat-hanger has been attached after having been removed from the pack's envelope intact with the coat and slacks 40/41, the slacks only having to be shifted from one side to a centered position upon both lower support-arms 38'/38", while the coat-arms are shown also in phantom-outline at 40'/40"; and because of the special spinewardly folded arrangement of FIG. 5 there are no unsightly creases nor wrinkles set into the coat-jacket particularly. Again the snag-hook 34 enables the entire commuter-pack to be hung vertically from one end via the convenience-hook 36 of the coathanger, thereby giving easy access to the items contained within the compartment 15, which may for example be an extra pair of shoes 42 and a shaving-kit 43, or any other desired items of similar size. Also seen here is the opposed arrangement of the gathered expansion-tucks 16'/17', along with the two opposite Velcro® type loop-fastener patches 19 which mate with the accompanying hook-fasteners 19'/19" necessarily during bike mounting only.

Study of FIG. 7 shows the general configuration of the preferred ⅛-inch diameter gauge aluminum wire-rod fabricated coathanger in its fully open condition, which is so maintained by the locked position of the detention-paw 45 until the hanger's lower support-arm portions 38'/38" are manually pulled away from the upper portions 35'/35" (ref. large arrow), so that the paw 45 becomes free from engagement behind arm portion 38' (ref. small arrow). Note also that the respective right and left support-arms of the hanger are thus free now to become folded toward each other as is demonstrated in FIG. 8, wherein a 2-sequence view assisted by an arrow indicates departure from the fully open position to a half-open 90-degree position. The reference pivotal-axis (PA-arrows) shows the relative center of rotation provided by the inter-coupling joints 46'/48' above and lower hinge-joints 46"/48" which cooperate to enable the coathanger to be ultimately folded 180-degrees flat into the condition represented in FIG. 5. Accordingly, it is to be understood that the wire-rod construction is comprised of two-pieces: one portion of which includes the lower auxiliary convenience-hook 36 which extends upward to form the upper coat-collar stay formation 39, then the wire stems down again to form a 190-degree loop 46', then continues on to form the upper shoulder support-arm 35' and down around the outer return-bend 47' to form lower support arm 38' where the wire formation ends in a small closed-loop 46"; the opposite wire-rod piece thus includes the detention-paw formation 45 which extends out from a 360-degree hinge-loop formation 48" which actually passes through the adjacent loop 46" to create the combined joint (like 46'/48' above), while continuing on to form the opposite lower-support 38" and then up around the outer return-bend 47" as portion 35", then forming a 360-degree loop 48' around through the coupling loop 46' making the upper hinge-joint, then vertically upward to form the question-mark (?) like hanger-hook 37 which is preferably finished with a non-snag bend 49. Although the preceding description may seem a bit involved, the actual finished embodiment is very simple looking and unique in its manner of folding convenience, which provides very effective coat-hanging in both of its open & folded modalities of usage.

Thus it is understood the utility of the foregoing commuter-pack invention in no way interferes with the normal function of a bicycle, yet certainly serves to provide greatly improved packaging of one's garments particularly. Moreover, while the present invention has been well-described hereinbefore by way of exemplified preferred embodiments, it should be realized that various changes, rearrangements, or obvious modifications are still further adaptable by those skilled in the art, without substantially departing from the implied spirit and scope of the invention essence.

What I claim under U.S. Patent Grant is:

1. A [cyclist's hand-portable Commuter-pack] *pack* apparatus of [sewn fabric construction] *generally flexible lightweight material* configured to be readily adapted to mounting upon an existing conventional rear/front *cycle* carrier-rack; comprising:

*a*) [an envelope type first] *a main* compartment *which extends from a first end to a second end when in a first substantially planar formation, said main compartment is* formed from a blank layer defining a first substantially flat portion [folded in half] upon an opposite substantially flat portion and having the [outer edge closed] *perimeter of said flat portions connected;*

*b*) *a primary opening to said main compartment with means for closing said primary opening, said primary opening extending substantially from said first end to said second end and thus will allow the main compartment to be completely opened by unfolding along an edge substantially parallel to a major axis which extends from said first end to said second end of the said main compartment* [by a perimeter zipper except for the folding edge perimeter, the envelope compartment thus opening out by unzippering and unfolding the blank layer, the first and opposite flat portions];

*c*) *said main compartment* being of substantial width *and said primary opening of substantial size* so as to thereby receive the [cyclist's coat-jacket when the jacket is specially folded spinewardly] *user's garments* so as to [lay] *lie* substantially from [one] *said first end to said second* end of [the envelope] *said main* compartment [to the other along with a pair of slacks if desired and whereupon the first flat portion is folded over the opposite flat portion and closed as an envelope by the zipper, the arrangement thus serving to eliminate unsightly horizontal creases in the coat since the jacket is never folded 180-degrees over upon itself in a direction horizontal to the standing wearer:] *when said main compartment is in said first substantially planar formation, and allow wrinkles to be removed from the user's garments before closing said opening;* [said apparatus being converted into a hand-carried modality by the provisions of a pair of satchel like handgrips, one of which is retracted into each end of the zippered envelope, and capable of being manually extracted by provision of opposed/dual sliders on said perimeter zipper which allows only a limited length of the zipper to be opened simultaneously at each respective extreme end of the zipper and said apparatus being converted into a rack-carried modality wherein the said zippered ends are closed entirely and the envelope is adopted to be centrally draped transversely over a carrier-rack in an inverted-U formation, whereupon a pair of buckled straps are attached at the resulting underside of the draped envelope are secured around and beneath the carrier-rack, while another pair of mounting straps are attached at each side of the envelope where they may be immediately wrapped around a portion of the bike frame such as the dual/afttrailing seat-stay down-tubes so as to hold the envelope intimately thereto, plus a special support-rod is sewn into the inwardly facing surfaces of the envelope as extensions of each said seat-stay mounting-straps, each rod thus extending diagonally downward so as to lay against the carrier-rack's substantially vertical support-arms which attach near the wheel-axis and thereby prevent the envelope from becoming entangled into the wheel-spokes; plus two additional longitudinal/support-rods are sewn into the envelope and adopted to contact the right and left sides of the carrier-rack, the rods each extending substantially along the full width of the inward facing surfaces of the envelope which may extend aftward a few inches in cantilevered manner from the carrier rack so as to thereby effectively extend the useful length of the envelope without otherwise dropping down, the rods being sewn into the underside of the envelope via webbing like coverings; and further including optional means by which other compartmentation may be integrated with said envelope for still greater utility function.]

*d) said pack apparatus is readily adapted to a second inverted-U formation when said main compartment is centrally draped transversely over a conventional cycle front/rear carrier-rack;*

*e) at least one supporting means attached to said main compartment comprising at least one rigid member supporting an upper aft portion of said main compartment beyond the aft extent of said conventional carrier-rack when in said inverted-U formation and for restraining each lower aft trailing edge of said inverted-U formation away from contacting the cycle wheel assembly*

*f) a plurality of fastening means compatible with said conventional cycle carrier-racks for retaining the upper portion of said inverted-U formation on said carrier-rack fore/aft and side-to-side and for retaining the sides of said inverted-U formation against a corresponding side of said carrier-rack while allowing said supporting means to restrain each said lower aft trailing edge away from said cycle wheel assembly.*

2. A [Commuter-pack] *pack* apparatus according to claim 1, wherein the said [first] *main* compartment includes a special diagonal cut-back relief section [at opposite ends thereof along said outer edges for pedal-clearance, when used in said inverted-U formation, said cut-back being] *along the leading edges of the lower extends of said inverted-U formation,* of about 20-degrees with respect to its longitudinal axis and thereby creating a downward tapering shape [where the perimeter zipper travels at the leading-edge, on both ends of said compartment while the lower ends are preferably formed in a rounded manner contiguous with said outer edges and said folding edge perimeter extending back up vertically at the portion of the envelope which forms the folded trailing-edge], *whereby adequate pedal clearance is provided.*

3. A [Commuter-pack] *pack* apparatus according to claim 1, wherein said opposite substantially flat portion defines right, left and upward facing sides when in said inverted-U formation and includes a [convenience type] second compartment made with four flexible walls attached over said upward facing sides formed as contiguous upward extensions of said right and left sides of said [first] *main* compartment [envelope], including [a flap like covering wall attached thereto] *an opening* which facilitates access [via a longitudinal zipper member].

4. A [Commuter-pack] *pack* apparatus according to claim 1, wherein said opposite substantially flat portion of said [first] *main* compartment includes right and left oppositely facing outer walls when in said inverted-U formation and each are separately adapted to form the inside inner-wall of a third and forth longitudinally oriented side pannier compartments, the respective third and forth side panniers thus having a substantially full height compartment outer-wall extending from the lower ends of the draped envelope upward, and are [conveniently] closed via approximately horizontal [zipper] closure *means* which each extend substantially the full width of the envelope [to which the separate compartments are identically formed].

5. A [Commuter-pack] *pack* apparatus according to claim 4, wherein is included near the lower region of each said respective right and left outer compartment wall a gathered tuck [like] formation which is made inverted so as to not gather debris or water, yet able to substantially expand the internal volume of the lower compartment region as the horizontal tuck unfolds.

[6. A Computer-pack apparatus according to claim 4, wherein are included downward facing flap like formations which serve to aid in sealing off said horizontal zipper-type fastener closures from the weather.]

7. A [Commuter-pack] *pack* apparatus according to claim 3, wherein is included a flexible retro-reflective material of equilateral-triangle planar formation centered upon one of said four flexible walls and adapted to be disposed above the wheel of a [bicycle] *cycle* when in said inverted-U formation and serving as a safety signal symbol to approaching vehicles.

8. A [Commuter-pack] *pack* apparatus according to claim 1, wherein [at least one] *an* inside end of [the envelope] *said main* compartment includes a [special multi-loop strap member sewn therein, and including a standard snag-hook device at its outermost end while the sewn loop formations are extended inward in a direction parallel to the folding end of the envelope; the snag-hook serving to receive a hook like hanger adapted to be engaged over the top of a door, or hooked directly to other convenient hanging places; the strap loops adapted to provide a hanging place for an envelope coat-hanger for example.] *clothes-hanger support means oriented perpendicular to the plane of said main compartment so as to support conventional hangers engaged thereon.*

9. A [Commuter-pack] *pack* apparatus according to claim 8, wherein is included a [special] folding coat-hanger formed of [wire-rod] *semi-rigid* material *comprising:*

*a) a top hook, substantially question-mark shaped,*

*b)* [, and having] left and right shoulder supports, [each having upper and lower support rods pivoted on upper and lower hinge joints and further including a vertical pivot axis formed by upper and a lower encircling loops as hinging joints which]

*c) a hinging means to* allow a nearly 180-degree [spineward] folding of [the coat to be attained without removal of the coat from its natural shoulder hanging condition; and including a special detention-paw made as an extension of the lower left shoulder support, to be engaged against the lower right shoulder support rod portion, whereby the user may manually pull axially upon the right and left lower support rods sufficiently as to cause a disengagement of the detention-paw which allows the respective hanger halfs to be thus folded axially, while the extreme opposite end of the detention-paw rod formation is routed upward near the upper hinge-joint of the left shoulder support so as to end in an approximate semicircle as a hanger-hook; the upper right shoulder high-joint having] *said coat-hanger substantially along the vertical axis of said top hook, and adopted so as to allow the folding of said coat-hanger while the garment remains engaged over said right and left shoulder supports of the hanger,*

*d) a means to retain said coat-hanger in the open position,*

*e)* an upwardly extending *rigid* continuation *beginning near the top of said hinging means of one shoulder support and* which turns back down tightly to form a special coat/collar-stay entity[, while the downward extension therefrom includes a convenient auxiliary hanger-loop entity to which a snag-hook or other coat-hanger may also be hung upon] *which is specifically provided to retain the garment on the hanger when in the folded position while the hanger is hung from the hook.*

[10. A Commuter-pack apparatus according to claim 9, wherein opening stop limits are provided at the said wire loop hinge-joints, whereby the lower loop hinge-joint reaches an interference limit stop against the said detention-paw extension, and the upper loop hinge-joint reaches a simultaneous interference limit stop against the said collar-stay extension member, thereby limiting the opening hinging action to a maximum of about 170-degrees from the flat folded condition.]

*11. A pack apparatus according to claim 1, including a handle and means attaching said handle to said main compartment whereby said apparatus may be hand-carried.*

*12. A pack apparatus according to claim 1 wherein the dimensions of the main compartment are reduced to the extent where a conventional suit jacket is folded spinewardly before insertion and storage whereby the spineward folding substantially reduces the resulting wrinkles in the user's garments and allows reduced overall dimensions of the pack.*

* * * * *